Oct. 4, 1966   C. L. SPAULDING   3,276,721
SPACE PARACHUTE CAPSULE
Filed Dec. 13, 1963

INVENTOR.
CHARLES L. SPAULDING
BY
Kimmel & Crowell
ATTORNEYS.

United States Patent Office 3,276,721
Patented Oct. 4, 1966

3,276,721
SPACE PARACHUTE CAPSULE
Charles L. Spaulding, Corpus Christi, Tex., assignor of one-half to Ward F. Steinbach, Corpus Christi, Tex.
Filed Dec. 13, 1963, Ser. No. 330,426
4 Claims. (Cl. 244—1)

This invention relates to a space parachute and relates more particularly to a parachute capsule device to be used in outer space emergency situations.

A primary object of the instant invention is the provision of a space parachute which is sturdy and durable in construction, reliable and efficient in operation, and relatively light weight and compact to provide for easy storage of the same.

Another object of the instant invention is the provision of a device of the character described, the major portions of which will readily collapse when not in use to conserve space where it is limited.

Yet another object of this invention to to provide a space parachute having a pair of concentric collapsible plastic wall members and means for feeding a foam material therebetween after an astronaut or the like is within the inner wall member to provide a heat resistant, substantially rigid protective layer for him.

A further object of this invention is the provision of such a device including means for ejecting the parachute in response to a predetermined atmospheric pressure.

Other and further objects reside in the combination of elements, arrangement of parts, and features of construction.

Still other objects will in part be obvious and in part be pointed out as the description of the invention proceeds and as shown in the accompanying drawing wherein.

Like reference characters refer to like parts throughout the several views of the drawing.

Figure 1:
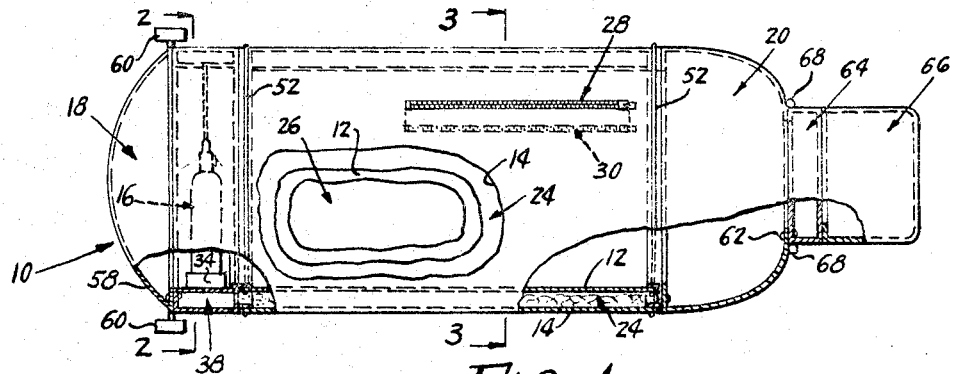
FIGURE 1 is a side elevational view of a space parachute capsule in accordance with the instant inventive concept, certain hidden parts being shown in dotted lines, and various parts being broken away for illustrative clarity.
Figures 2, 3:
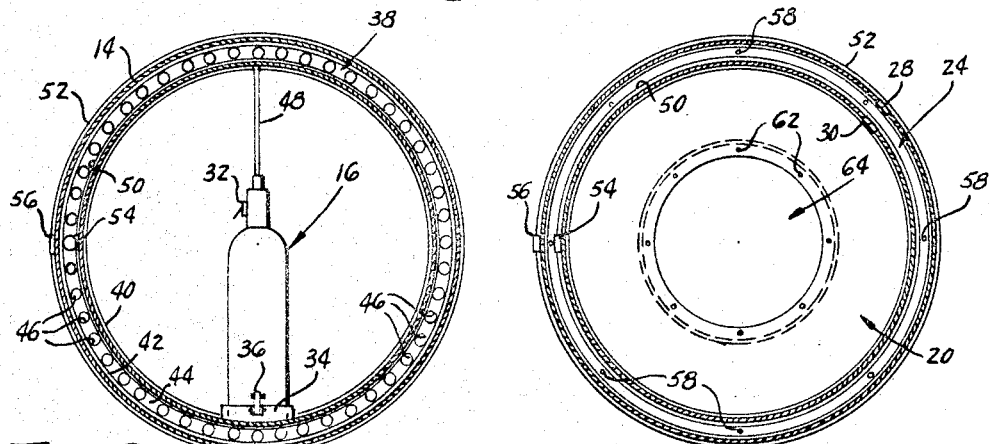
FIGURE 2 is an enlarged transverse cross-sectional view taken substantially on line 2—2 of FIGURE 1.
FIGURE 3 is an enlarged transverse cross-sectional view taken susbtantially on line 3—3 of FIGURE 1.

Referring now to the drawing in general, a space parachute capsule in accordance with the instant inventive concept is designated generally by the reference numeral 10 and includes a pair of concentric inner and outer wall members 12, 14, respectively, a source of foam material 16, heat shield means 18 closing one end of the concentric wall members, dome means 20 closing the other end of the wall members, and a parachute means 22 operatively connected to the dome means to carry the capsule 10 when in use.

The inner and outer wall members 12, 14, respectively, are each formed of a substantially cylindrical, collapsible bag made of a plastic material such as polyethylene or the like and define therebetween a first substantially cylindrical chamber 24 for receiving the foam material in a manner to be explained in more detail hereinafter, the inner wall member 12 defining the major portion of an astronaut-receiving cavity 26. Aligned, closable entry means 28 and 30 in the form of the slide fasteners such as zippers or the like are operatively secured to each wall member 12, 14 so that an astronaut or the like may climb into the cavity 26 closing the entry means 28, 30 behind him.

The source of foam material 16 is preferably a pressurized container of a plastic foam material, manufactured commercially by Du Pont, and currently used for insulation, the plastic foam being heat resistant and forming a substantially rigid barrier in a relatively short period of time. The container 16 has a valve means 32 which may be either manually operable or automatically operable. A support member 34 is provided for rigidly carrying the container 16 and any conventional clamping means 36 may be used to secure the same in position. A second substantially cylindrical chamber 38 is defined between rigid wall members 40, 42 and is aligned with the first chamber 24, a distributing ring 44 having a plurality of peripherally spaced apertures 46 defined therein is interposed between the first and second chambers, the apertures 46 communicating between these two chambers. A conduit 48 connects the valve means 32 to the second chamber 38 to feed the foam material thereinto for substantially uniform distribution through the apertures 46 into the first chamber 24 after the astronaut has entered the capsule. The plastic wall members 12 and 14 are secured in place by inner and outer clamping rings 50 and 52, respectively, having adjustable clamping members 54 and 56 of any conventional form.

The heat shield means 18 is formed of a high heat resistant material and is secured to a portion connecting the wall members 40 and 42 by a plurality of circumferentially spaced bolt means 58.

To conserve space, it is to be understood that the heat shield means as shown may be replaced by a pair of spaced plastic members similar to the wall members 12, 14 having an oval front and defining a chamber therebetween adapted to receive foam material from the source 16 thereby providing a heat shield.

Retro rockets 60 may be secured in spaced relationship about the periphery of the heat shield means 18 and may be provided with control means (not shown) operable from within the cavity 26 by the astronaut in any conventional manner.

Figures 4, 5:
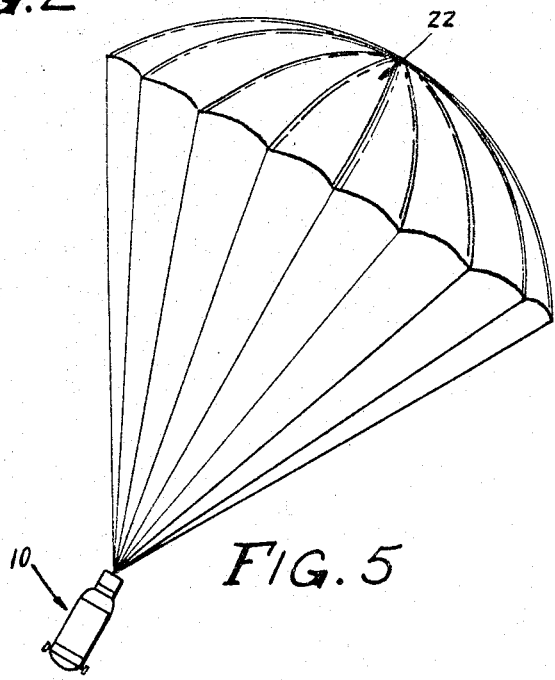
FIGURE 4 is an enlarged fragmentary cross-sectional view showing a detail of the construction.
FIGURE 5 is a side elevational view of the device in operation.

The dome 20 is preferably transparent and is secured in a suitable fashion such as by clamping rings to the wall members 12, 14, the opposite end of the dome being secured by bolts or the like 62 to a parachute ejecting device designated generally by the reference numeral 64 and operable at a particular atmospheric pressure, such as when the capsule reaches 40,000 feet, to release the parachute means 22 from its pack 66. The specific details of construction of the ejecting means 64 does not form a part of the instant invention, and may include such elements as explosive bolts designed to blow the pack 66, or a cover member thereof, free from the rest of the capsule so that the parachute 22 may open as shown particularly in FIGURE 5 to provide a drag effect on the capsule 10 as it descends through the atmosphere.

Air blast means 68 may be provided with control means (not shown) operable in any suitable manner from within the cavity 26 by the astronaut to provide proper tilt to the capsule for the re-entry, the retro rockets 60 facilitating in proper orientation of the capsule and slowing down of the same.

The use and operation of the space parachute of the instant invention will now be apparent. An astronaut or the like, upon encountering difficulty in the main space vehicle, enters the cavity 26 by opening the entry means 28, 30 and closing the same behind him. Foam is then released from the source 16 by actuation of the valve means 32 to fill the second chamber 38, the apertures 46 in the distributing ring 44 uniformly filling the first chamber 24 to provide a rigid, heat resistant barrier for the astronaut. The capsule 10 is then ejected from the main space vehicle in any suitable manner, the retro rockets 60 and the air blast 68 providing proper tilt for re-entry into the atmosphere, and the ejecting means 64 releasing the parachute 22 from the pack 66 at a predetermined pressure.

The foam container 16, the distributing ring 44 and each of the plastic bags 12, 14 are made of a plastic material which is readily replaced after each use. Similarly, the other elements in the space capsule may be made of plastic or other such suitable materials.

It has been found by experience that a six inch layer of foam material in the first chamber 24 is most satisfactory, although the specific dimensions of the device of the instant invention may vary as will be obvious to those with ordinary skill in the art.

The space parachute capsule 10, depending on its specific dimensions, may weigh as little as 175 pounds or even less, which is extremely important in view of the great thrust necessary for lifting a designated payload into orbit.

It will now be seen that there is herein provided an improved space parachute which satisfies all of the objectives of the instant invention, and others, including many advantages of great practical utility and commercial importance.

Since many embodiments may be made of the instant inventive concept, and since many modifications may be made of the embodiments hereinbefore shown and described, it is to be understood that all matter herein is to be interpreted merely as illustrative and not in a limiting sense.

I claim:

1. A space parachute capsule of the character described comprising a pair of radially spaced concentric inner and outer walls defining an annular chamber therebetween which is adapted to be filled with plastic foam insulating material, said inner wall defining a cylindrical man-sized compartment, said inner and outer walls being provided with aligned closable entry means, a heat shield secured to one end of said inner and outer walls by which one end of each of said annular chambers and said compartment are closed, a dome secured to the other ends of said inner and outer walls by which the other end of each of said annular chambers and said compartment are closed, a parachute pack which is adapted to have a parachute mounted therein and secured to the outer end of said dome, an ejecting device for said parachute pack secured to said dome in position to eject said parachute pack from said dome, a pressurized container of plastic foam insulating material secured in fixed position in said compartment, a conduit connected between said container and said annular chamber through which plastic foam insulating material is adapted to be injected into said annular chamber from said container, and a valve which is interposed in said conduit and is adapted to be actuated by an occupant of said compartment to control the injection of plastic foam into said annular chamber.

2. A space parachute capsule as defined by claim 1 in which: said annular chamber is divided into front and rear sections by a partitioning ring which is interposed in fixed position between said inner and outer walls, said partitioning ring having a plurality of annularly spaced apertures therein providing communication between said front and rear sections, and said conduit is connected between said container and the said rear section of said annular chamber.

3. A space parachute capsule as defined by claim 1 in which said inner and outer concentric walls are formed of collapsible plastic material.

4. A space parachute capsule as defined by claim 1 in which said dome is formed of transparent material.

References Cited by the Examiner

UNITED STATES PATENTS 3,093,346   6/1963   Faget et al. _____ 244—1

FOREIGN PATENTS 1,158,848   12/1963   Germany.

OTHER REFERENCES

Space Aeronautics, September 1960, pp. 45–47.

MILTON BUCHLER, *Primary Examiner*.

FERGUS S. MIDDLETON, *Examiner*.

A. E. CORRIGAN, *Assistant Examiner*.